(12) United States Patent
Hwang

(10) Patent No.: US 12,738,859 B2
(45) Date of Patent: Sep. 15, 2026

(54) SWITCHING POWER SUPPLY AND POWER FACTOR CORRECTION CONTROLLER THEREFOR HAVING IMPROVED INPUT CURRENT SENSING

(71) Applicant: Champion Microelectronic Corporation, Hsinchu (TW)

(72) Inventor: Jeffrey Hwang, Saratoga, CA (US)

(73) Assignee: Champion Microelectronic Corporation (TW)

( * ) Notice: Subject to any disclaimer, the term of this patent is extended or adjusted under 35 U.S.C. 154(b) by 154 days.

(21) Appl. No.: 18/630,931

(22) Filed: Apr. 9, 2024

(65) Prior Publication Data

US 2024/0348157 A1 Oct. 17, 2024

Related U.S. Application Data

(60) Provisional application No. 63/528,621, filed on Jul. 24, 2023, provisional application No. 63/459,453, filed on Apr. 14, 2023.

(51) Int. Cl.

| | |
|---|---|
| ***H02M 1/00*** | (2007.01) |
| ***H02M 1/42*** | (2007.01) |
| ***H02M 3/335*** | (2006.01) |
| ***H02M 7/217*** | (2006.01) |
| ***H02M 7/219*** | (2006.01) |
| *H02M 3/00* | (2006.01) |

(52) U.S. Cl.

CPC ......... *H02M 7/217* (2013.01); *H02M 1/0009* (2021.05); *H02M 1/4208* (2013.01); *H02M 1/4241* (2013.01); *H02M 7/219* (2013.01); *H02M 3/01* (2021.05)

(58) Field of Classification Search

CPC ............. H02M 1/4208; H02M 1/0009; H02M 3/33571; H02M 3/33576

See application file for complete search history.

(56) References Cited

U.S. PATENT DOCUMENTS 6,531,854 B2 * 3/2003 Hwang ............... H02M 1/4225 323/242

6,657,417 B1 * 12/2003 Hwang ..................... G05F 1/70 363/84

(Continued)

FOREIGN PATENT DOCUMENTS

CN 101399494 A * 4/2009

*Primary Examiner* — Sisay G Tiku

(74) *Attorney, Agent, or Firm* — Derek J. Westberg, Esq.

(57) ABSTRACT

A power factor correction controller for a switching power supply is disclosed. The controller is configured to generate a switch control signal for modulating an input current to form an output voltage across an energy storage element. A gain modulator is configured to combine an output voltage error signal with an instantaneous input voltage sensing signal. A current source is configured to draw a current signal from an output node of the gain modulator, wherein the current signal is representative of an instantaneous input current sensing signal. Thereby a voltage at the output node is representative of the instantaneous input voltage sensing signal, the instantaneous input current sensing signal and the output voltage error signal. A comparator is configured to compare the voltage at the output node to a ramp signal to form a switch modulation signal that controls timing of the switch control signal.

9 Claims, 3 Drawing Sheets

(56) References Cited

U.S. PATENT DOCUMENTS 9,438,119 B1 * 9/2016 Hwang ............. H02M 3/33592
2002/0196644 A1 * 12/2002 Hwang ............... H02M 1/0845
363/89
2003/0222633 A1 * 12/2003 Hwang ................... H02M 1/36
323/282
2016/0322907 A1 * 11/2016 Hwang ................... H02M 1/36
2024/0348177 A1 * 10/2024 Hwang ................. H02M 7/217

* cited by examiner

SWITCHING POWER SUPPLY AND POWER FACTOR CORRECTION CONTROLLER THEREFOR HAVING IMPROVED INPUT CURRENT SENSING

This application claims priority of U.S. Ser. No. 63/459,453, filed Apr. 14, 2023, and U.S. Ser. No. 63/528,621, filed Jul. 24, 2023. The entire contents of the aforementioned applications are hereby incorporated by reference.

BACKGROUND OF THE INVENTION

The present invention relates to the field of switching power supplies.

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears substantially as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

A conventional PFC converter monitors the AC source voltage and input current in order to maintain current drawn from the AC source substantially in phase with the AC voltage. The input current is typically sensed using a current sensing resistor located in the current return path to the AC source. This sensing resistor generates a voltage that is representative of the input current. This voltage is then used to control switching such that the input current tracks the input voltage so that the power supply appears substantially as a resistive load to the AC source.

It is desired to provide an improved power factor correction converter. It is desired also to provide improved input current sensing for a power factor correction converter.

SUMMARY OF THE INVENTION

The present invention is directed toward a switching power supply and improvements thereof. In accordance with an embodiment, a power factor correction converter and controller are disclosed. The controller is configured to generate a switch control signal for modulating an input current to form an output voltage across an energy storage element. A gain modulator is configured to combine an output voltage error signal with an instantaneous input voltage sensing signal. A current source is configured to draw a current signal from an output node of the gain modulator, wherein the current signal is representative of an instantaneous input current sensing signal. Thereby a voltage at the output node is representative of the instantaneous input voltage sensing signal, the instantaneous input current sensing signal and the output voltage error signal. A comparator is configured to compare the voltage at the output node to a ramp signal to form a switch modulation signal that controls timing of the switch control signal.

These and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

The present invention is directed towards an improved power factor correction converter and controller for a switching power supply. The converter and controller are configured to provide improved input current sensing. The improvements are expected to increase operational efficiency of the converter. In accordance with an embodiment, a switching power supply includes at least a first power supply stage, in particular, a power factor correction (PFC) stage. The switching power supply may include a second power supply stage, for example, a DC-to-DC converter stage. The first power supply stage is configured to receive an AC voltage as input and to generate a DC output voltage. The second power supply stage receives the DC output voltage of the first power supply stage and generates a further DC output voltage. The rectified output of the PFC stage is typically at higher voltage and is more loosely regulated than the output of the DC-to-DC stage.

Figure 1:
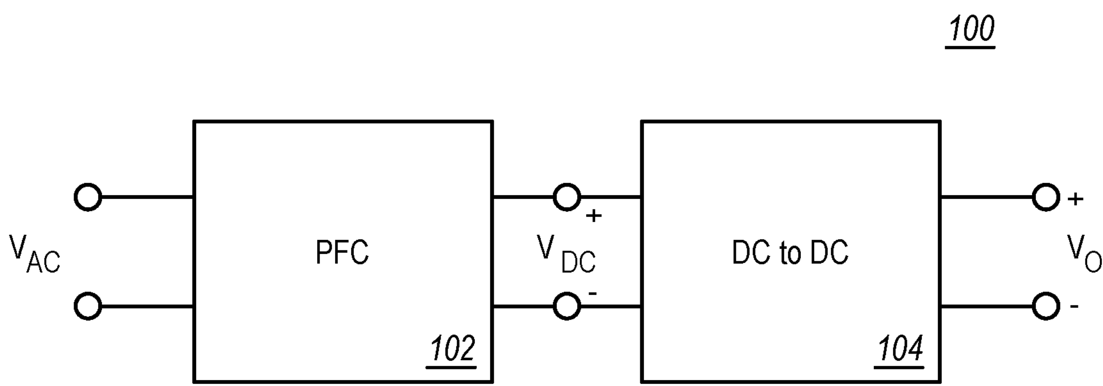
FIG. 1 illustrates a block schematic diagram of a two-stage, off-line power supply in accordance with an embodiment of the present invention.

FIG. 1 illustrates a block schematic diagram of a two-stage, off-line power supply 100 in accordance with an embodiment of the present invention. As shown in FIG. 1, a first power supply stage 102 has an input coupled to alternating-current (AC) source $V_{AC}$. The first power supply stage 102 can be a power factor correction (PFC) stage. The PFC stage 102 performs rectification on the AC input signal and maintains current drawn from the AC source substantially in phase with the AC voltage so that the power supply 100 appears as a resistive load to the AC source. The PFC stage 102 generates a loosely regulated output voltage, $V_{DC}$.

The output voltage $V_{DC}$ of the PFC stage 102 can be provided as input to a second power supply stage 104. The second power supply stage 104 can be a DC-to-DC converter stage. Using the input $V_{DC}$, the DC-to-DC converter stage 104 generates a voltage-regulated, DC output, $V_O$, which can be used to power a load. The level of $V_{DC}$ is preferably at a higher voltage and can be more loosely regulated than the output $V_O$ of the DC-to-DC converter stage 104. A target level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Figure 2:
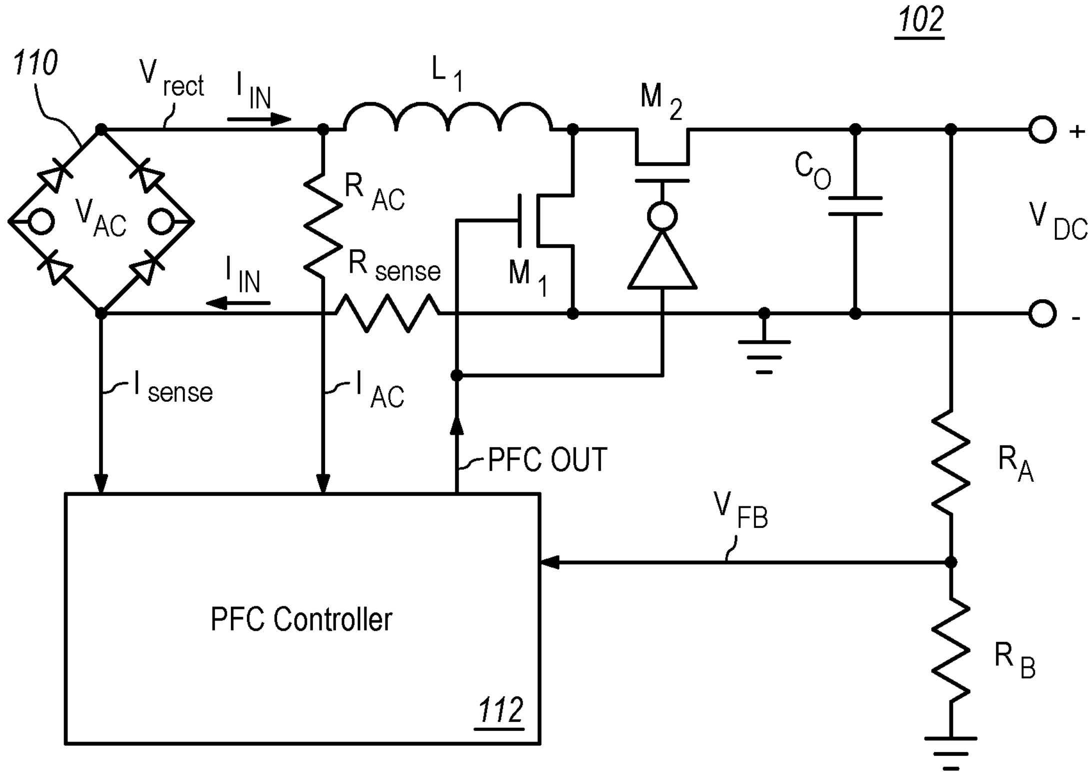
FIG. 2 illustrates a schematic circuit diagram of a power factor correction stage in accordance with an embodiment of the present invention.

FIG. 2 illustrates a schematic circuit diagram of a power factor correction (PFC) stage 102 in accordance with an embodiment of the present invention. An alternating-current (AC) input source $V_{AC}$ is coupled across input terminals of a bridge rectifier 110. A rectified input voltage signal Vrect is formed at a first output terminal of the rectifier 110 and is coupled to a first terminal of a main PFC inductor $L_1$ and to a first terminal of a resistor $R_{AC}$. A second terminal of the inductor $L_1$ is coupled to a first terminal of a transistor switch $M_1$ and to a first terminal of a transistor switch $M_2$.

A second terminal of the switch $M_2$ is coupled to a first terminal of an output capacitor $C_O$. A second terminal of the switch $M_1$ and a second terminal of the capacitor $C_O$ are coupled to a ground node.

A second terminal of the resistor $R_{AC}$ is coupled to a voltage sensing input of a PFC controller 112. An input voltage sensing signal $I_{AC}$, which is representative of the instantaneous rectified input voltage Vrect, flows through the resistor $R_{AC}$ and is received by the controller 112. A second output terminal of the bridge rectifier 110 is coupled to a current sensing input of the controller 112 and to a first terminal of a resistor Rsense. A second terminal of the resistor Rsense is coupled to the ground node. An input current sensing signal Isense that is representative of the instantaneous current input to the power factor correction stage 102 is received by the controller 112.

An output voltage sensing signal $V_{FB}$ is formed by series-coupled resistors $R_A$ and $R_B$. The resistor $R_A$ has a first terminal coupled to the output voltage $V_{DC}$ and a second terminal coupled to a first terminal of resistor $R_B$. A second terminal of the resistor $R_B$ may be coupled a ground node. The resistors $R_A$ and $R_B$ form a voltage divider in which the signal $V_{FB}$ is formed at the node between the resistors $R_A$ and $R_B$. The signal $V_{FB}$ is representative of the output voltage $V_{DC}$.

The PFC controller 112 generates a switch control signal PFC OUT which controls the opening and closing of the switches $M_1$ and $M_2$ so as to regulate the intermediate output voltage $V_{DC}$ while maintaining the input current in phase with the input voltage $V_{AC}$. To accomplish this, the controller 112 uses the signal $V_{FB}$, as well as the input voltage sensing signal $I_{AC}$ and the input current sensing signal Isense. The switches $M_1$ and $M_2$ are operated such that when one is opened, the other is closed.

Figure 3:
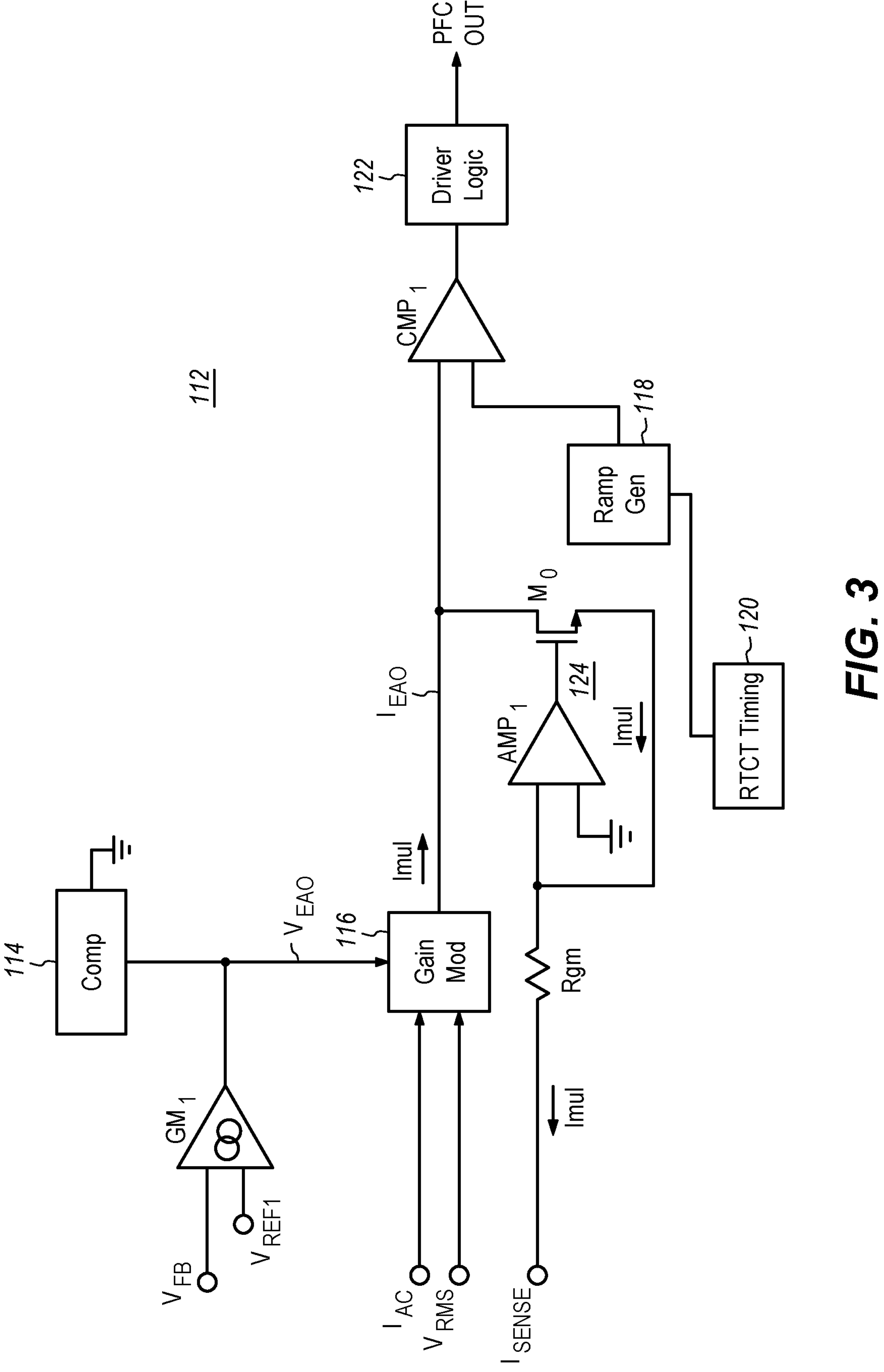
FIG. 3 illustrates a block schematic diagram of a controller for a power factor correction stage in accordance with an embodiment of the present invention.

FIG. 3 illustrates a block schematic diagram of the PFC controller 112 in more detail in accordance with an embodiment of the present invention. Within the controller 112, the signal $V_{FB}$ is coupled to a first input terminal of a transconductance error amplifier $GM_1$. A second input of the error amplifier $GM_2$ is coupled to a reference voltage $V_{REF1}$ that is representative of a desired level for the output voltage $V_{DC}$. An output of the error amplifier $GM_1$ forms a signal $V_{EAO}$, which is an output voltage error signal that is representative of a difference between the actual level of the output voltage $V_{DC}$ and a desired level for the output voltage. As shown in FIG. 3, the error signal $V_{EAO}$ is formed across a compensation circuit 114.

In an embodiment, the level of the reference voltage $V_{REF1}$ corresponds to a target level of 380 volts DC for the PFC output $V_{DC}$. For example, when the level of $V_{AC}$ is 115 volts AC, the PFC output $V_{DC}$ may have a target level of 380 volts DC. As another example, when the level of $V_{AC}$ is 220 volts AC, the level of $V_{VREF1}$ may correspond to a target level of 311 volts DC for the PFC output $V_{DC}$.

A gain modulation block 116 receives the error signal $V_{EAO}$ as well as the signal $I_{AC}$ for generating a modulated error signal Imul. The gain modulation block 116 can, optionally, also received a signal $V_{RMS}$. The signal $V_{RMS}$ is representative of the level of the AC line voltage and can be used to inhibit switching in the PFC stage 102, by gradually pulling down the level of the signal Imul, if the AC line voltage is too low for an extended period (i.e. under "brown out" conditions). The level of $V_{RMS}$ is preferably representative of an average value of the input voltage $V_{AC}$ (as opposed to an instantaneous value, as is the case for $I_{AC}$). The signal $V_{RMS}$ can be generated, for example, by applying the signal $I_{AC}$, which represents an instantaneous value of the input voltage $V_{AC}$, to a filter that generates signal $V_{RMS}$ by averaging value of $I_{AC}$ over at least one cycle of the AC input voltage $V_{AC}$.

The output of the gain modulation block 116 is coupled to a first controlled terminal of transistor $M_0$ and to a first input terminal of a comparator $CMP_1$. A second controlled terminal of the transistor $M_0$ is coupled to first input of an amplifier $AMP_1$ and to first terminal of a current sensing resistor Rgm. A second terminal of the resistor Rgm is coupled to receive the signal Isense. A second input terminal of the amplifier $AMP_1$ is coupled to a ground node. An output of the amplifier AMP1 is coupled to a control terminal of the transistor $M_0$. The transistor $M_0$ is preferably a MOSFET transistor with the first controlled terminal being its drain terminal, the second controlled terminal being its source terminal and the control terminal being its gate terminal.

A signal $I_{EAO}$ is formed at the output of the gain modulation block 116. The signal $I_{EAO}$ is representative of the output voltage error signal $V_{EAO}$ as well as the input voltage and the input current to the PFC stage, as explained herein. Because the second input terminal of the amplifier $AMP_1$ is coupled to ground, the first terminal of the amplifier $AMP_1$ forms a "virtual" ground. Accordingly, the input current sensing signal Isense is applied across the resistor Rgm. A current Imul which passes through the resistor Rgm is, therefore, proportional to the input current sensing signal Isense. The signal Isense is representative of the instantaneous input current to the power factor correction converter (see FIG. 2). Accordingly, the current Imul is also representative of the instantaneous input current.

The amplifier $AMP_1$ and transistor $M_0$ form an input current sensor 124. The current sensor 124 implements a current follower circuit arrangement. The input current sensor 124 is configured to draw this same current Imul from the node at the output of the gain modulator 116.

According to FIGS. 2 and 3, the level of Imul is given by:

$$Imul = I_{IN} \times Rgm / \mathrm{Rsense}$$

where Imul and $I_{IN}$ are sinusoidal AC signals. It can be seen from the equation above that Rgm and Rsense can both be small. Therefore, an advantage of the present invention over conventional input current sensing techniques is that the resistors Rgm and Rsense (FIG. 3) can both be small which also reduces power consumption and therefore increases efficiency. The precise values of these resistors can therefore be optimized for efficiency dependent upon the application, for example, expected load power.

The signal $I_{EAO}$ is coupled to the first input of the comparator $CMP_1$. A ramp generator 118 forms a ramp signal PFC RAMP which is coupled to a second input terminal of the comparator $CMP_1$. An RTCT node of the ramp generator 118 is coupled to an RTCT timing network 120 which sets the frequency of the ramp signal.

The comparator $CMP_1$ forms a switch modulation signal at its output. The switch modulation signal is coupled to driver/logic block 122 which includes driver and logic circuit elements for forming the PFC switch control signal PFC OUT. The signal PFC OUT controls the transistor switches $M_1$ and $M_2$ of the PFC stage 102 (FIGS. 1-2) of the switching power supply 100 (FIG. 1).

The signal $I_{EAO}$ functions to implement a first feedback loop which equalizes the signals $I_{AC}$ and $I_{SENSE}$ in order to maintain the input voltage Vrect in phase with the input current $I_{AC}$. This first feedback loop includes the signals $I_{AC}$ and $I_{SENSE}$, as well as the gain modulation block 116, the resistor Rgm, and the current sensor 124. The first feedback loop controls the instantaneous duty cycle of the switches $M_1$ and $M_2$ of the PFC stage 102 so as to maintain the input voltage Vrect in phase with the input current $I_{AC}$. In other words, the duty cycle is adjusted throughout each cycle of the sinusoidal AC input signal. As a result, the PFC converter appears to the AC input source as a resistive (i.e. non-reactive) load.

The signal $I_{EAO}$ also functions to implement a second feedback loop which regulates the output voltage $V_{DC}$ at its desired level. This second feedback loop includes the signals $V_{FB}$, $V_{REF1}$ and $V_{EAO}$ as well as the gain modulation block 116. The second feedback loop controls the average duty cycle of the switches $M_1$ and $M_2$ of the PFC stage 102 so as to regulate the PFC output voltage $V_{DC}$. In other words, the duty cycle is adjusted over several cycles of the sinusoidal AC input signal according to the level of $V_{EAO}$. As a result, the PFC converter maintains a constant output voltage.

It will be apparent that the PFC function and control of switching in the PFC stage 102 as shown in FIG. 3 can be accomplished in other ways and by employing different circuit arrangements.

Figure 4:
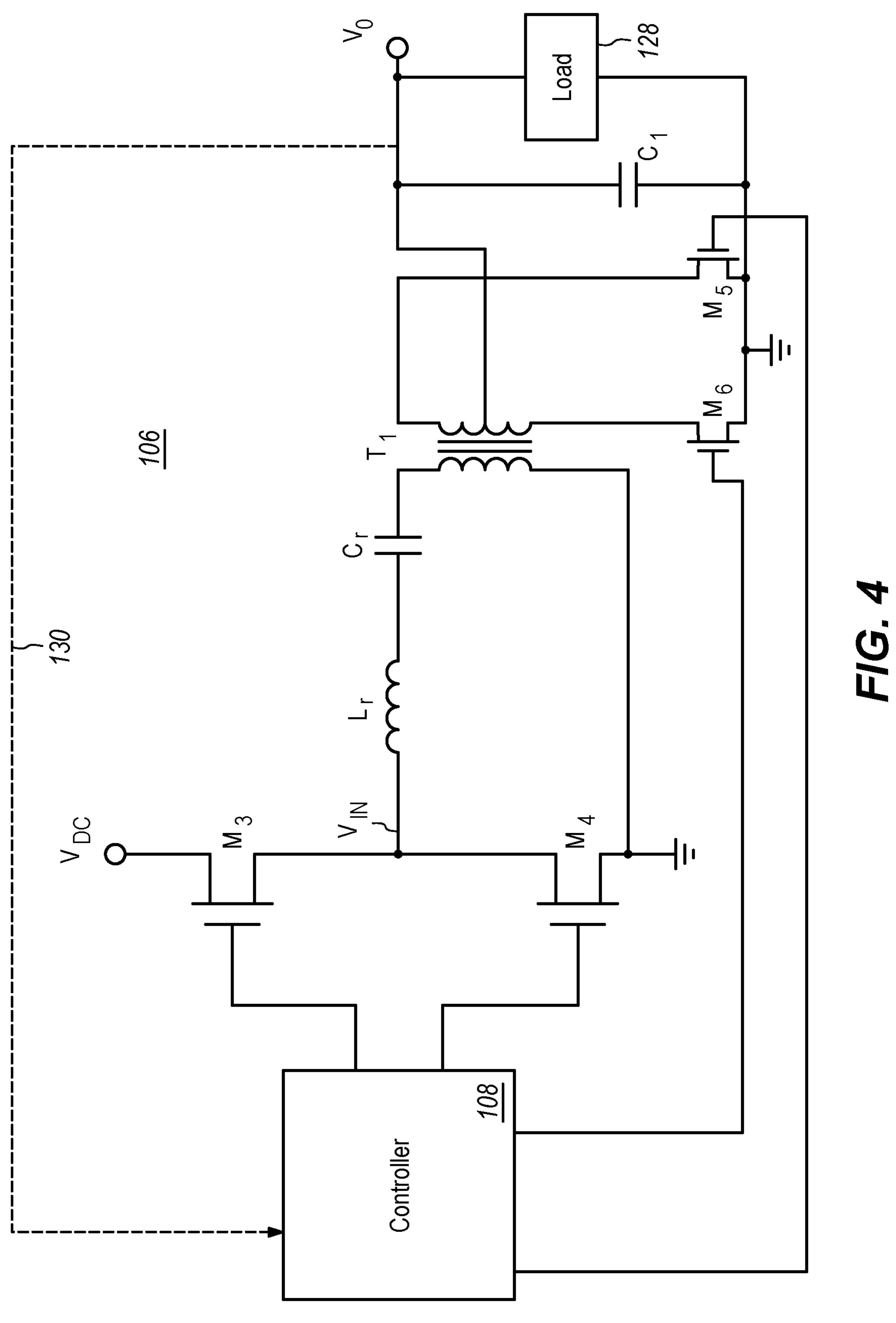
FIG. 4 illustrates a schematic circuit diagram of a DC-to-DC converter stage in accordance with an embodiment of the present invention.

FIG. 4 illustrates a schematic diagram of a resonant switching converter 106 in accordance with an embodiment of the present invention. The resonant switching converter 106 may be, for example, included in the DC-to-DC converter 104 of FIG. 1. Referring to FIG. 5, the converter 106 includes a half-bridge switching inverter that includes a pair of series-connected transistor switches $M_3$ and $M_4$. A power source, such as the output $V_{DC}$ generated by the PFC stage 102 (FIG. 1), is coupled to a first terminal of the transistor switch $M_3$. A second terminal of the transistor switch $M_3$ is coupled to a first terminal of a transistor switch $M_4$ to form an intermediate node. The second terminal of the transistor switch $M_4$ is coupled to a ground node. Control terminals of each of the transistor switches $M_3$ and $M_4$ are coupled to a controller 108. The controller 108 controls opening and closing of the pair of transistor switches $M_3$ and $M_4$. When the switch $M_3$ is closed and the switch $M_4$ is open, the intermediate node is coupled to $V_{DC}$. This raises a voltage, $V_{IN}$, at the intermediate node. When the switch $M_3$ is open and the switch $M_4$ is closed, the intermediate node is coupled to ground. This lowers the voltage, $V_{IN}$, at the intermediate node.

Energy storage elements are coupled to the intermediate node. Particularly, as shown in FIG. 4, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage $V_{IN}$ at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $M_5$. A second terminal of the secondary winding of the transformer $T_1$ is coupled to a first terminal of a transistor switch $M_6$. A second terminal of the transistor switch $M_5$ and a second terminal of the transistor switch $M_6$ are coupled to a ground node. Control terminals of each of the transistor switches $M_5$ and $M_6$ are coupled to the controller 108. The controller 108 controls opening and closing of the transistor switches $M_5$ and $M_6$.

A center tap of the secondary winding of the transformer $T_1$ is coupled to a first terminal of a capacitor $C_1$. A second terminal of the capacitor $C_1$ is coupled to a ground node. An output voltage, $V_O$, is formed across the capacitor $C_1$. A load 110 may be coupled across the capacitor $C_1$ to receive the output voltage $V_O$. The output voltage $V_O$, or a voltage that is representative of the output voltage, is fed back to the controller 128 via a feedback path 130.

Adjusting the switching frequency of the transistor switches $M_5$ and $M_6$ adjusts impedance of the resonant tank and, therefore, adjusts the amount of power delivered to the load 128. More particularly, decreasing the switching frequency tends to increase the power delivered to the load 128. Increasing the switching frequency tends to reduce the power delivered to the load 128. By monitoring the level of the output voltage $V_O$ via a feedback path 130, the controller 108 can adjust the switching frequency to maintain the output voltage $V_O$ constant despite changes in the power requirements of the load 128 and despite changes in the level of the input $V_{DC}$. This is referred to as frequency modulation or FM modulation. In an embodiment, the output voltage $V_O$ is regulated at a level of 12.0 volts DC, however, it will be apparent that some other output voltage level can be selected. While FIG. 4 shows a half-bridge switching inverter, it can be replaced with a full-bridge switching inverter or with some other DC-to-DC converter topology.

The foregoing detailed description of the present invention is provided for the purposes of illustration and is not intended to be exhaustive or to limit the invention to the embodiments disclosed. Accordingly, the scope of the present invention is defined by the appended claims and any amendments thereto.

What is claimed is:

1. A switching power supply comprising power factor correction converter, the power factor correction converter comprising:

- a switch configured to modulate an input current received from a rectified alternating-current supply to form an output voltage across an energy storage element in response to a switch control signal; and
- switch control circuitry configured to generate the switch control signal wherein the switch control circuitry comprises:
  - a gain modulator configured to combine an output voltage error signal with an instantaneous input voltage sensing signal and the gain modulator having an output node;
  - an input current sensor configured to draw a current signal from the output node of the gain modulator, wherein the current signal is representative of an instantaneous input current sensing signal, wherein the input current sensor comprises: a transistor having a first controlled terminal, a second controlled terminal and a control terminal; and an amplifier having a first input terminal coupled to a ground node, a second input terminal coupled to a current sensing resistor and an output terminal coupled to the control terminal of the transistor, thereby a voltage at the output node is representative of the instantaneous input voltage sensing signal, the instantaneous input current sensing signal and the output voltage error signal; and
  - a comparator configured to compare the voltage at the output node to a ramp signal to form a switch modulation signal that controls timing of the switch control signal.

2. The switching power supply according to claim 1 wherein the switch control circuitry is configured to regulate the output voltage and to maintain an input voltage and the input current in phase.

3. The switching power supply according to claim 1 wherein a value of the current sensing resistor is selected according to power supplied by the power factor correction converter to improve efficiency.

4. The switching power supply according to claim 1 further comprising a DC-to-DC converter stage coupled to receive the output voltage of the power factor correction converter.

5. A controller for a power factor correction converter, comprising:

switch control circuitry configured to generate a switch control signal for modulating an input current received from a rectified alternating-current supply to form an output voltage across an energy storage element in response to the switch control signal, wherein the switch control circuitry comprises:

a gain modulator configured to combine an output voltage error signal with an instantaneous input voltage sensing signal and the gain modulator having an output node;

an input current sensor configured to draw a current signal from the output node of the gain modulator, wherein the current signal is representative of an instantaneous input current sensing signal, wherein the input current sensor comprises: a transistor having a first controlled terminal, a second controlled terminal and a control terminal; and an amplifier having a first input terminal coupled to a ground node, a second input terminal coupled to a current sensing resistor and an output terminal coupled to the control terminal of the transistor, thereby a voltage at the output node is representative of the instantaneous input voltage sensing signal, the instantaneous input current sensing signal and the output voltage error signal; and a comparator configured to compare the voltage at the output node to a ramp signal to form a switch modulation signal that controls timing of the switch control signal.

6. The power factor correction converter according to claim 5 wherein the switch control circuitry is configured to regulate the output voltage and to maintain an input voltage and the input current in phase.

7. The power factor correction converter according to claim 5 wherein a value of the current sensing resistor is selected according to power supplied by the power factor correction converter to improve efficiency.

8. An input current sensor for a power factor correction converter comprising:

a transistor having a first controlled terminal, a second controlled terminal and a control terminal; and an amplifier having a first input terminal coupled to a ground node, a second input terminal coupled to a current sensing resistor and an output terminal coupled to the control terminal of the transistor, wherein the input current sensor is configured to draw a current signal from an output node of a gain modulator, wherein the current signal is representative of an instantaneous input current sensing signal, the instantaneous input current sensing signal being representative of an input current for the power factor correction converter.

9. The input current sensor for the power factor correction converter according to claim 8 wherein a voltage at the output node of the gain modulator is representative of an instantaneous input voltage sensing signal, the instantaneous input current sensing signal and an output voltage error signal, and wherein the instantaneous input voltage sensing signal is representative of a rectified input voltage for the power factor correction converter and the output voltage error signal is representative of a difference between a desired output voltage for the power factor correction converter and a monitored output voltage for the power factor correction converter.

* * * * *